Patented July 16, 1946

2,403,966

UNITED STATES PATENT OFFICE 2,403,966

POLYMER SLURRY PROCESS

John R. Brown, Jr., Westfield, and Irving E. Lightbown, Cranford, N. J., assignors to Standard Oil Development Company, a corporation of Delaware No Drawing. Application October 14, 1942, Serial No. 461,986

8 Claims. (Cl. 260—8)

This invention relates to polymerization processes and rubber-like polymers; relates particularly to processes for the interpolymerization of iso-olefins and diolefins; and relates especially to the polymerization of olefinic material in the presence of non-reactive components for maintaining the solid polymer in a finely dispersed condition.

It is known in the art that synthetic rubber-like polymers are produced by the polymerization or interpolymerization of an iso-olefin such as iso-butylene, with or without a diolefin such as butadiene, isoprene, pentadiene, dimethyl butadiene, or the like. The polymerization reaction is conducted at temperatures ranging from about $-40°$ C. or $-78°$ C. to $-160°$ C. or lower, and consists in the mixing of the liquefied olefins with a liquefied diluent-refrigerant such as liquid ethylene or with a refrigerant such as solid carbon dioxide with or without a higher boiling diluent. To the rapidly stirred mixture is then added, preferably by spraying onto the surface, a catalyst consisting of aluminum chloride or similar metal halide dissolved in a suitable solvent such as carbon disulfide or the low-freezing alkyl halides. The resulting polymer has a molecular weight ranging from 20,000 to 150,000 or above, has an iodine number ranging from 0.1 to 40, preferably between 0.5 and 10, depending upon the quantity of diolefin interpolymerized into the polymer; and in addition the polymer has the capability of reacting with sulfur, in spite of its very low iodine number, to develop an elastic limit in the material, a tensile strength ranging from 2500 lbs. to 4500 lbs./sq. in., an ultimate elongation ranging from 500% to 1200%, and a high abrasion and flexure resistance. The resulting material, while not a true synthetic rubber in any way, is a high-grade substitute for rubber, possessing many advantages over rubber.

The polymer is a plastic, elastic solid, but it has been found exceedingly difficult to obtain the solid polymer during the interpolymerization reaction in the form of small particle aggregates with a physical structure adapted for efficient and convenient processing through such subsequent steps as the flashing off of unreacted olefinic material, diluent and refrigerant; and washing out of spent catalyst or residual catalyst. Likewise, it is difficult to prevent cohesion between the particles of the interpolymer, and to prevent adhesion of the particles of interpolymer to the reactor, to the supporting screen in the drier, and other metal objects with which the interpolymer comes in contact.

When the polymer is prepared in the presence of substantial quantities of a diluent or diluent-refrigerant such as liquid ethylene, it is only slightly sticky at the polymerization temperature, and is only slightly sticky at room temperature when moistened with water; but at temperatures in the range from about $-55°$ C. to about $-20°$ C., it is extremely sticky and it shows a very great tendency to coalesce into large coherent masses, and to adhere to surfaces with which it comes into contact. In other methods of preparation, where small quantities only of diluent, or no diluents are present, the material is extremely sticky at the polymerization temperature, and at the intermediate intervening temperatures and is troublesomely sticky at room temperature in water. These characteristics of the newly polymerized material interfere seriously with the handling of the product and with the complete removal of spent and surplus catalysts, since the sticky character of the interpolymer causes it to adhere to the treating apparatus, and to cohere in relatively large lumps, containing occluded catalysts which cannot be washed out or removed in subsequent operations.

It is an object of the invention to eliminate these undesirable characteristics from the interpolymer and to obtain fine particle suspensions or slurries by adding into the reaction mixture, either prior to the polymerization reaction or prior to the flashring operation but preferably prior to the polymerization reaction, a small quantity of an inert material in order to coat the solid particles of interpolymer formed so as to keep them in a dispersed condition during the subsequent operations; which material may later be washed out of the polymer if desired. This material serves as a deflocculating agent to prevent the undesired cohesion and adhesion of the polymer throughout its processing.

A further object of the present invention is to provide a new and useful combination of processing steps for the treatment of low temperature interpolymers to obtain and maintain the solid interpolymers in the form of fine-grained slurries. A further object is the slurrying of the interpolymers in water, and the maintenance of the slurry during subsequent processing, including dry and subsequent mechanical working and milling operations.

The objects of the invention are accomplished by the incorporation into the reaction mixture prior to the interpolymerization reaction of an inert deflocculating material in the form of a fine powder which may comprise inert powders such as talc, whiting, zinc oxide, other pigments or various inorganic fillers, colloidal clays, such as bentonite, kieselguhr and the like; and other swellable materials such as powdered gelatine, powdered gum tragacanth, gum arabic and the like. Other objects and details of the invention will be apparent from the following description.

In practicing the present invention, the steps of preparing a reactive mixture of the desired olefinic material at the desired low temperature is in accordance with the steps as taught in Australian Patent No. 112,875, issued to R. M. Thomas and W. J. Sparks or in the corresponding U. S. Patent 2,356,128, issued Aug. 22, 1944 to Thomas and Sparks.

Broadly these steps comprise mixing in the proper proportions an iso-olefin containing 4 to 8 carbon atoms such as isobutylene with a diolefin capable of interpolymerization with an isoolefin and containing 4 to 12 carbon atoms such as butadiene, isoprene, 2,3-dimethyl-1,3 butadiene; piperylene, or a non-conjugated diolefin such as 2-methyl-hexadiene-1,5; 2,6-dimethyl-hexadiene-1,5; or triolefins such as hexatriene, myrcene; 1,6-dimethyl-heptatriene-1,3,5 and 2,4,6-trimethyl-1,3,5-hexatriene, or the like and cooling the mixture by internal refrigeration by means of solid carbon dioxide or external refrigeration, e. g., by liquid ethylene, to a temperature ranging from $-80°$ C. to $-100°$ C. or as low as $-160°$ C.

To this mixture there is then added a small quantity of a pulverant or comminuted, inert, deflocculating material selected from the class consisting of inert powders such as talc, whiting, calcium silicates, zinc oxide pigments, inorganic fillers, colloidal clays such as bentonite, kieselguhr and the like; or a swellable aqueous colloid such as gelatine or gum tragacanth or gum arabic or powdered agar or the like. The inert material may be added as such in a pulverant form or may be dispersed in methyl chloride or in the feed. After the inert material has been thoroughly dispersed in the reaction mixture, there is then added a Friedel-Crafts type catalyst; which may be boron fluoride or aluminum chloride in solution in an inert low-freezing solvent such as ethyl or methyl chloride or other similar active halide materials. This polymerization reaction is conducted under conditions to give a finely grained form of interpolymer which is highly desirable, in order to permit the maximum speed of processing the solid interpolymer in subsequent operations.

The catalyst may be any convenient Friedel-Crafts catalyst as is indicated by N. O. Calloway in his article on the "Friedel-Crafts synthesis" printed in the issue of "Chemical Reviews," published for the American Chemical Society at Baltimore in 1935; volume XVII, No. 3, the article beginning on page 327; the list of useful Friedel-Crafts catalysts being particularly well shown on page 375. For the solvent, any of the mono- or poly-aliphatic halides having less than about three or four carbon atoms are useful; the compounds having carbon atoms above about 2, requiring special low-temperature technique to produce a satisfactory catalyst solution, and the mono-halides being preferred. In addition, such solvents as carbon disulfide are also useful.

When the polymerization reaction has reached a desired stage of completion, the unreacted materials are separated from the residual polymerization mixture in any convenient manner. The entire reaction mixture may be mixed quickly with water, in a vigorously stirred tank, or by other means; the water being preferably quite warm to supply the necessary heat of vaporization for the residual volatile components of the reaction mixture. This process step results in the formation of a relatively fine-grained slurry of the polymer in water, which is particularly advantageous to handle, since the deflocculating agent prevents coalescence of the particles during the warming-up procedure, and similarly prevents adhesion of the particles to the container.

The resulting polymer slurry in water is readily processed by any of a number of subsequent steps. The polymer slurry is readily separated from the water merely by straining out the polymer, and the fine grains of polymer are readily dried to remove both the water and residual traces of diluent and reactants, by treatment in a drying oven. Alternatively, the polymer may be washed in a kneader or on the mill as desired, using substantial quantities of water (preferably warm), to remove the deflocculating agent and the residual traces of reaction mixture; as well as to destroy any residual traces of catalyst. When gelatine or other aqueous colloids are used, they are water soluble and are very readily removed from the polymer, together with the catalyst and volatile reaction mixture components by a relatively short, simple and easy washing operation. In the case of the pigment type of deflocculating agent, the removal is not so readily accomplished, although, particularly in the case of the bentonite type of clays and the talc, a major portion of the pigment may be removed by a reasonable amount of washing in the kneader or on the mill.

It is of course advantageous to use pigments which may be retained in the polymer to avoid the necessity of prolonged washing; or, if a polymer free from deflocculating agents is desired, it is of course preferable to use the aqueous colloid type of material. In either instance, the polymer may be dried and milled to prepare it for further use.

*Example I*

An olefinic mixture consisting of 495 parts by volume of isobutylene and 5 parts by volume of isoprene (70% purity) was diluted with 1000 parts by volume of liquid ethylene. To this mixture there was then added 10 parts (by weight) of a good grade of talc in the form of a hydrous magnesium silicate having a soft, greasy touch, which is available in various grades; such as potstone, steatite or French chalk. The mixture was prepared in a reactor equipped with stirring means, and provided with a cover to avoid contact with the air and to confine the volatilized portions of the mixture. The reactor was carefully insulated to reduce the rate of heat inflow and to reduce the volatilization of the ethylene refrigerant. The catalyst was prepared by dissolving commercial anhydrous aluminum chloride in methyl chloride at the boiling point of the methyl chloride to yield a nearly saturated solution containing about 1.0% of materials calculated as aluminum chloride. This solution was then diluted with an additional amount of methyl chloride to produce a solution containing 0.5% of dissolved aluminum chloride. This solution was then precooled to $-78°$ C. and applied through a spray nozzle onto the surface of the vigorously stirred olefinic mixture. The polymerization proceeded rapidly and was approximately 80% complete in about 5 to 7 minutes.

The interpolymer was formed in the reactor as a fine-particle slurry in the residual liquid, particularly in the ethylene. The slurry was then dumped into a flash tank for the final separation of the interpolymer and the diluent-refrigerant, and it was found to retain its fine-particle character with no perceptible tendency to coalesce into large aggregates. The solid interpolymer, after thorough washing with water and drying was found to have a molecular weight of 80,000. This molecular weight was satisfactory, and the polymer was suitable for compounding and curing with non-sulfur vulcanizing agents of the type of quinone dioxime to give desirable vulcanizates; and the interpolymer material was found to be in a particularly advantageous form for subsequent processing, including such steps as drying with hot air and for mechanical working on the mill.

*Example II*

Example I was repeated with the following variation: no talc was added to the polymerization reaction mixture. After the polymerization reaction was completed, it was noted that the interpolymer particles formed agglomerated into a large bulky mass, quite different from Example I. The solid polymer, after thorough water washing and drying was found to have a molecular weight of 80,000. This molecular weight was satisfactory, and the solid polymer was suitable for compounding and curing to give a vulcanizate possessing desirable physical characteristics. The tendency of the interpolymer material, however, to coalesce or agglomerate after the completion of the polymerization reaction and in the washing steps was highly undesirable, since the coalesced material was difficult to handle and was not suitable for plant operations such as hot air drying and mechanical working on mill rolls.

*Example III*

A similar mixture to that in Example I was prepared, and to it was added approximately 10 parts by weight of the weight of the olefinic material of bentonite. The polymerization was then conducted, as in Example I, and an excellent polymer well filled with the bentonite was obtained. The polymer showed only a minor tendency to agglomerate while in the cold liquid; coalesced only slightly during the warming up; and formed an excellent slurry in water at room temperature. The small amount of coalescence which occurred during the warming up was readily overcome, merely by vigorous stirring, since, in water, the bentonite swells up and disperses the polymer very effectively in the water.

*Example IV*

A similar mixture to that in Example I was prepared, and to it was added approximately 2 parts by weight on the olefinic mixture of finely powdered gelatine. Gelatine as an amino acid is, at room temperature, strongly reactive with aluminum chloride; but at polymerization temperatures below about —40° C. the material is wholly inert and non-reactive. Nevertheless the particles serve as polymerization nuclei, and as a dispersing and deflocculating agent for the particles of polymer; and, when the material was brought up to room temperature in water, the gelatine substance swelled very rapidly and yielded a very thorough dispersion of the polymer.

These examples are representative of three groups of addition agents according to the invention. Example I shows an inert powder; talc, which is representative of a considerable number of fine, inert powders, which will serve to prevent agglomeration of the polymer particles. The group includes such substances as rouge, clay, whiting, zinc oxide, chromite, vermillion, and many other inert, finely powdered pigments. Example III shows a second class of substances which, like the colloidal class, tends to swell up and disperse the material in the presence of water. These materials are the mineral fillers prepared from such substances as the diatomaceous earth materials of silicious origin known to the trade as "Celite"; and include the infusorial earths and clays of the hydrous-silicate-of-alumina type. Example IV shows an organic colloid having powerful swelling properties which is representative of a considerable number of substances including gelatine, gum tragacanth, gum arabic, agar-agar, and tannin.

Other inert anticoalescing materials, enumerated above and illustrated by the present invention, include such substances as kieselguhr, abestine, infusorial earth, whiting, calcium silicate, magnesium carbonate, Kalite, lithophone, titanium pigment, zinc oxide, zinc sulfide, organic toners and various waxes such as carnauba, montan and rubber wax. These are the preferred species to be added severally or in admixture in a pulverant comminuted form to the reaction mixture prior to the commencement of the interpolymerization reaction, since they impart highly advantageous and desirable physical properties to the vulcanizate. Since some of the materials enumerated above particularly the waxes are soluble in the alkyl halides, they may be incorporated in the form of a solution or supension and used as such in distributing the inert materials into the interpolymerization reaction mixture.

These anticoalescing materials may, in some instances, remain in the polymer through subsequent compounding, molding, and curing operations to serve as filters and colorants. Alternatively some of them may be more or less completely washed out by kneading the polymer in water in equipment such as the Werner and Pfleiderer kneader. Relatively short time of kneading in water will remove nine-tenths or more of the aqueous colloids and substantially all can be washed out by a reasonable length of time of kneading. In this respect, these materials are sharply different from other types of pigments, such as the reinforcing pigments, which cannot be washed out but become an integral part of the polymer mass.

These examples and the practicing of this invention show that the broad class of inert pulverant, comminuted, inert materials—such as talc, inorganic pigments, clays, organic colloids, etc.—will function to control and reduce the coalescing tendency of the slurry of interpolymer in the reaction medium as anticoalescing agents and serve as internal inert extenders when added to the interpolymers in the process of their formation in order to decrease the extent of agglomeration, and to reduce the tendency of the interpolymer to adhere to metal and to coalesce in the intermediate drying and processing operations.

Thus the invention consists of the steps, in combination, of adding to the interpolymerization mixture of olefinic or olefinic-polyolefinic materials at low temperatures an inert anticoalescing and filler material, polymerizing the olefins in the presence of anticoalescing material and then slurrying the solid polymer in water by the aid of the anticoalescing material.

While there are above disclosed but a limited number of embodiments of the invention, it is possible to provide still other embodiments without departing from the inventive concept here disclosed; and it is therefore desired that only such limitations be imposed upon the appended claims as are stated therein or required by the prior art.

The invention claimed is:

1. In a polymerization process in which a major quantity of an isoolefin of 4 to 8 carbon atoms is polymerized with a minor quantity of a diolefin of 4 to 12 carbon atoms at a temperature of from −20° to −160° C., by means of a solution of a Friedel-Crafts catalyst dissolved in an alkyl halide which is liquid at polymerization temperatures, the step of conducting the polymerization in the presence of an inert deflocculating agent, then separating the polymer in a dispersed form from the polymerization mixture, slurrying the polymer in water, and maintaining it in a dispersed form after polymerization by the action of the deflocculating agent.

2. A polymerization process comprising the steps in combination of mixing a major proportion of an isoolefin having 4 to 8 carbon atoms, inclusive, with a minor proportion of a diolefin having 4 to 12 carbon atoms, inclusive, cooling the mixture to a temperature within the range of −20° C. to −160° C., adding to the mixture an inert deflocculating agent comprising bentonite, polymerizing the mixture by the addition of a Friedel-Crafts catalyst dissolved in an alkyl halide solvent which is liquid at the polymerization temperature, separating the polymer in dispersed form from the polymerization mixture, slurrying the polymer in water, and maintaining the polymer in dispersed form after polymerization by the action of the deflocculating agent.

3. A polymerization process comprising the steps in combination of mixing a major proportion of an isoolefin having 4 to 8 carbon atoms, inclusive, with a minor proportion of a diolefin having 4 to 12 carbon atoms, inclusive, cooling the mixture to a temperature within the range of −20° C. to −160° C., adding to the mixture an inert deflocculating agent, polymerizing the mixture by the addition of a Friedel-Crafts catalyst dissolved in an alkyl halide solvent which is liquid at the polymerization temperature, separating the polymer in dispersed form from the polymerization mixture adding the polymer to water, and maintaining the polymer in dispersed form after polymerization by the action of the deflocculating agent.

4. A polymerization process comprising the steps in combination of mixing a major proportion of an isoolefin having 4 to 8 carbon atoms, inclusive, with a minor proportion of a diolefin having 4 to 12 carbon atoms, inclusive, cooling the mixture to a temperature within the range of −20° C. to −160° C., adding to the mixture an inert deflocculating agent comprising gelatine, polymerizing the mixture by the addition of a Friedel-Crafts catalyst dissolved in an alkyl halide which is liquid at the polymerization temperature, separating the polymer in dispersed from from the polymerization mixture, slurrying the polymer in water, and maintaining the polymer in dispersed form after polymerization by the action of the deflocculating agent.

5. A polymerization process comprising the steps in combination of mixing a major proportion of isobutylene with a minor proportion of a diolefin having 4 to 12 carbon atoms, inclusive, cooling the mixture to a temperature within the range of −20° C. to −160° C., adding to the mixture an inert deflocculating agent, polymerizing the mixture by the addition of a Friedel-Crafts catalyst dissolved in a non-complex-forming solvent which is liquid at the polymerization temperature, separating the polymer in dispersed form from the polymerization mixture, slurrying the polymer in water, and maintaining the polymer in dispersed form after polymerization by the action of the deflocculating agent.

6. A polymerization process comprising the steps in combination of mixing a major proportion of isobutylene and a minor proportion of butadiene, cooling the mixture to a temperature within the range of −20° C. to −160° C., adding to the mixture an inert deflocculating agent, polymerizing the mixture by the addition of a Friedel-Crafts catalyst dissolved in a non-complex-forming solvent which is liquid at the polymerization temperature, separating the polymer in dispersed form from the polymerization mixture, slurrying the polymer in water, and maintaining the polymer in dispersed form after polymerization by the action of the deflocculating agent.

7. A polymerization process comprising the steps in combination of mixing a major proportion of isobutylene and a minor proportion of isoprene, cooling the mixture to a temperature within the range of −20° C. to −160° C., adding to the mixture an inert deflocculating agent, polymerizing the mixture by the addition of a Friedel-Crafts catalyst dissolved in a non-complex-forming solvent which is liquid at the polymerization temperature, separating the polymer in dispersed form from the polymerization mixture, slurrying the polymer in water, and maintaining the polymer in dispersed form after polymerization by the action of the deflocculating agent.

8. A polymerization process comprising the steps in combination of mixing a major proportion of isobutylene and a minor proportion of dimethyl butadiene, cooling the mixture to a temperature within the range of −20° C. to −160° C., adding to the mixture an inert deflocculating agent, polymerizing the mixture by the addition of a Friedel-Crafts catalyst dissolved in a non-complex-forming solvent which is liquid at the polymerization temperature, separating the polymer in dispersed form from the polymerization mixture, slurrying the polymer in water, and maintaining the polymer in dispersed form after polymerization by the action of the deflocculating agent.

JOHN R. BROWN, Jr.
IRVING E. LIGHTBOWN.